(12) United States Patent
Dabrowski

(10) Patent No.: US 7,757,540 B2
(45) Date of Patent: Jul. 20, 2010

(54) DEVICE AND METHOD FOR TESTING TORQUE WRENCHES

(76) Inventor: Robert A. Dabrowski, 40 Old Dublin Rd., Marborough, NH (US) 03455

( * ) Notice: Subject to any disclaimer, the term of this patent is extended or adjusted under 35 U.S.C. 154(b) by 570 days.

(21) Appl. No.: 11/799,421

(22) Filed: May 1, 2007

(65) Prior Publication Data

US 2008/0271515 A1 Nov. 6, 2008

(51) Int. Cl.
*G01G 19/56* (2006.01)
(52) U.S. Cl. ...................................... 73/1.12
(58) Field of Classification Search ............ None
See application file for complete search history.

(56) References Cited

U.S. PATENT DOCUMENTS

| | | | | | |
|---|---|---|---|---|---|
| 2,691,295 | A | * | 10/1954 | Zeiger | 73/1.12 |
| 3,364,725 | A | * | 1/1968 | Grabovac | 73/1.12 |
| 3,587,307 | A | * | 6/1971 | Newberg | 73/862.21 |
| 3,675,464 | A | * | 7/1972 | Larson | 73/1.12 |
| 4,069,915 | A | * | 1/1978 | Schurman | 206/305 |
| 4,759,225 | A | * | 7/1988 | Reynertson et al. | 73/862.21 |
| 5,181,425 | A | * | 1/1993 | Livingston | 73/862.08 |
| 5,911,154 | A | * | 6/1999 | Hsieh | 73/1.12 |

\* cited by examiner

*Primary Examiner*—Robert R Raevis
(74) *Attorney, Agent, or Firm*—David J. Wilson

(57) ABSTRACT

The present invention is directed towards inexpensive and reliable devices and methods for testing the calibration of torque wrenches.

13 Claims, 6 Drawing Sheets

DEVICE AND METHOD FOR TESTING TORQUE WRENCHES

BACKGROUND OF INVENTION

Torque wrenches are used to ensure that the correct force is used in fastening nuts, blots and other threaded, screw type fasteners that are secured by tightening. Under tightened (i.e., under torqued) treaded fasteners can result in assembled parts becoming loose or coming apart causing damage to parts, premature product failure and creating hazardous or deadly situations for users of the product. Over tightened fasteners are difficult to remove, can cause stripped threads that can be expensive to replace or repair and may not allow adequate space for assembled parts during expansion and contraction due to heat and friction. Over tightened fasteners can also cause torn or broken bolts leading to premature product failure and creating hazardous or deadly situations for users of the product. Specifications for assembly of products often require that screw type fasteners be secured at specific ranges of torque. Those specifications are usually given in foot pounds or the metric equivalent. People use torque wrenches to ensure that screw type fasteners are tightened to product specification.

Tests conducted by Applicant show that between ⅓ and ½ of all new and remanufactured torque wrenches are off calibration by 10-25% from the displayed reading on the device. Furthermore, the discrepancies between the displayed value and the real value may increase over time with continued usage of the torque wrench. The only way to be sure that a torque wrench is calibrated properly is to test it regularly.

Prior art devices for testing torque wrenches are limited. The most common type of device is called a stress tester. These devices are expensive and, often times, fragile since the devices contain a large amount of sensitive electronics and one or more LCD or LED displays. One example of a stress tester is made by Sturtevant Richmont (Franklin Park, Ill.) under the brand name of Veritorq. Another available tester is the Imada digital torque wrench tester made by Imada Corp. (Northbrook, Ill.). Both of these devices retail for well over $1000 dollars.

Therefore, what is need is an inexpensive and reliable device and method for testing the calibration of torque wrenches.

SUMMARY OF INVENTION

In one aspect, the invention relates to an inexpensive and reliable device and method for testing the calibration of torque wrenches.

In its broadest form, the device of the present invention, in one embodiment, comprises a base unit on to which is mounted a modified torque wrench of known calibration.

A torque wrench is a wrench designed to permit the fastening of nuts and bolts to a desired tightness. The tightness of nuts and bolts is typically given in "foot pounds" (ft-lbs) or the "Newton-meters" (N/m). For convenience, the term foot-pounds will be used herein but the devices and methods of the present invention may be used in any form of measurement.

The simplest form of torque wrench is called a beam-type torque wrench and comprises a long lever arm between the handle and the wrench head, made of a material which will bend elastically a little under the applied torque. A second smaller bar (pointer arm) carrying an indicator is connected back from the head in parallel to the lever arm. This second arm is under no strain at all, and remains straight. A calibrated scale is fitted to the handle, and the bending of the main lever causes the scale to move under the indicator. When the desired indicated torque is reached, the operator stops applying force. This type of wrench is simple, does not easily loss calibration but is not very precise.

A more sophisticated method of presetting torque is using a calibrated clutch mechanism (referred to herein as a "click-type" torque wrench). At the point where the desired torque is reached, the clutch slips, preventing overtightening. The most common form uses a ball detent and spring, with the spring preloaded by an adjustable screw thread, calibrated in torque units. The ball detent transmits force until the preset torque is reached, at which point the force exerted by the spring is overcome and the ball "clicks" out of its socket. The advantage of this design is greater precision and a positive action at the set point. A number of variations of this design exist for different applications and different torque ranges. A modification of this design is used in some drills to prevent gouging the heads of screws while tightening them. Click-type torque wrenches are more precise when properly calibrated however the more complex mechanism can result in them losing calibration far quicker than the beam-type wrench where there is little to no malfunction. Any torque wrench of known calibration may be used with the present invention although a device comprising the beam-type torque wrench is the preferred embodiment.

The device of the present invention comprises a torque wrench of known calibration. In a preferred embodiment, the torque wrench of known calibration is calibrated using a stress tester. When calibrated, a scale comprising the correct calibration may be affixed to the location on the torque wrench designed for receiving scales.

The scale of the device of the present invention is not limited by any particular range, units or gradations. In one embodiment, the scale of the device of the present invention reads form about 10-100 foot-pounds. In another embodiment, the scale of the present invention reads from about 50-100 foot-pounds. In one embodiment, the gradations are in 1-lb. increments. In another embodiment, the gradations are in 5-lb. increments. Those skilled in the art will know that other ranges, units and gradations can be used with the device of the present invention.

The torque wrenches of known calibration of the present invention are modified for use with the device of the present invention. In particular, one way in which they are modified is that the head of the torque wrench of known calibration is designed to receive the male socket of a torque wrench to be tested. In one embodiment, this is accomplished by affixing to the head of the torque wrench of known calibration a device comprising a female socket, the female socket sized to fit the male socket of the torque wrench to be tested. For example, if the torque wrench to be tested has a male socket size of ⅜ inches, the head of the torque wrench of known calibration will have a female socket sized to receive a male socket of ⅜ inches. In one embodiment, the device sized to fit the male socket of the torque wrench to be tested (i.e., the device comprising the female socket) is exchangeable with other devices of differing sizes that are designed to be affixed to the head of the torque wrench of known calibration. In another embodiment, the device sized to fit the male socket of the torque wrench to be tested is permanently affixed to the head of the torque wrench of known calibration. Common sizes are ¼ inch, ⅜ inch. ½ inch, ¾ inch and 1 inch. However, the present invention is not limited to the size of the male/female sockets. For example, other non-standard sizes or metric sizes are contemplated to be used with the device of the present invention.

In one embodiment, the invention comprises a base unit for securing the device to a firm surface such as the top of a heavy table or a wall and a calibration device secured to the base unit. The base unit may be made from any suitable material. In one preferred embodiment, the base unit is made from a flat piece of metal or metal alloy. The flat piece of metal, while not limited to any particular size so long as it is large enough to secure the calibration unit of the invention, may be, for example, from 3-8 inches wide by 20-40 inches long by ¼-¾ inch thick.

In another embodiment, the base unit of the present invention comprises two sections. A first section of the base unit is located under the scale end of the torque wrench of known calibration and a second section of the base unit is located under the head end of the torque wrench of known calibration.

The base comprises a means for securing the device of the present invention to a surface. For example, the base may comprises holes drilled into the base for the purpose of securing the base with bolts to the surface. In another embodiment, the base may comprise bolts welded on to or otherwise attached to the base unit. These bolts are then used to secure the base unit to a suitable surface. Other methods of attaching the base unit to a suitable surface may include adhesives, nails, screws or welding. A suitable surface for mounting the base unit is any surface that can support the device of the present invention along with any force that is applied when the device is being used. In a preferred embodiment, the surface suitable for mounting the base unit will allow the mounting of device of the present invention at a height or position that minimizes any parallax error.

The torque wrench of known calibration is mounted on the base unit. In one embodiment, the means for securing said torque wrench to said base unit comprises i) a ring mounted perpendicularly to said base unit (the mounting ring), said ring positioned and sized to receive the lever arm of said torque wrench of known calibration; and, ii) a hollow cylinder comprising a center area and a wall, said cylinder mounted to said base unit such that the axis of said cylinder is perpendicular to said base unit and said cylinder has a portion of the wall of said cylinder removed thereby creating a recess in the wall of said cylinder for positioning the head of the torque wrench of known calibration and a grove in the wall of said cylinder, said grove being parallel to said base unit, said grove being capable of receiving a ring (the retaining ring) and said grove positioned such that when said ring is placed in said grove, said ring prevents said torque wrench of known calibration from being removed from said cylinder.

A method of using the device of the present invention comprises, in one non-limiting embodiment, inserting the male socket of the torque wrench to be tested into the female socket of the torque wrench of known calibration. Force is then applied to the torque wrench to be tested. The reading on the scale of the torque wrench to be tested in then compared to the readings on the scale on the torque wrench of known calibration. The user can then decide if the tested torque wrench is accurate or accurate enough for the task(s) for which it will be used. In one embodiment, a difference of greater than 5% between the torque wrench of known calibration and the torque wrench to be tested indicates that the torque wrench to be tested is out of calibration. In another embodiment, a difference of greater than 2% between the torque wrench of known calibration and the torque wrench to be tested indicates that the torque wrench to be tested is out of calibration. In another embodiment, a difference of greater than 1% between the torque wrench of known calibration and the torque wrench to be tested indicates that the torque wrench to be tested is out of calibration.

Other features and advantages of the invention will be apparent from the following description.

DETAILED DESCRIPTION OF PREFERRED EMBODIMENTS

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

While the invention has been described with respect to a limited number of embodiments, those skilled in the art, having benefit of this disclosure, will appreciate that other embodiments can be devised which do not depart from the scope of the invention as disclosed herein.

Figure 1A:
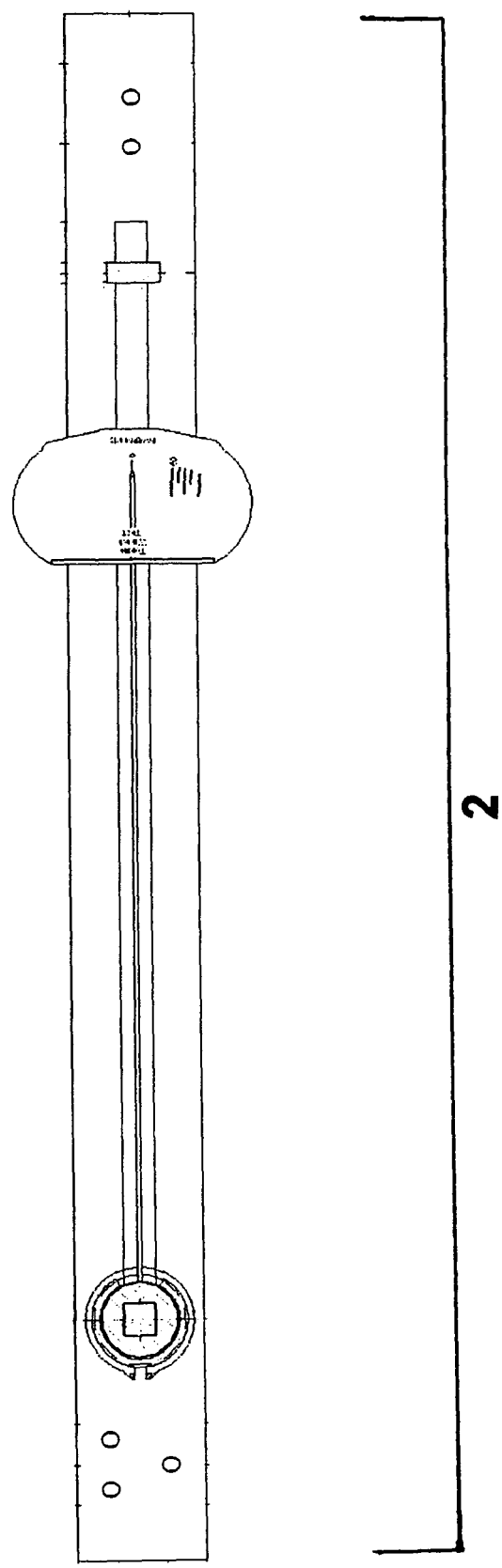
FIG. 1(A) shows a top view of one embodiment of device of the present invention.

FIG. 1(A) shows a top view of one embodiment of the device (2) of the present invention.

Figure 1B:
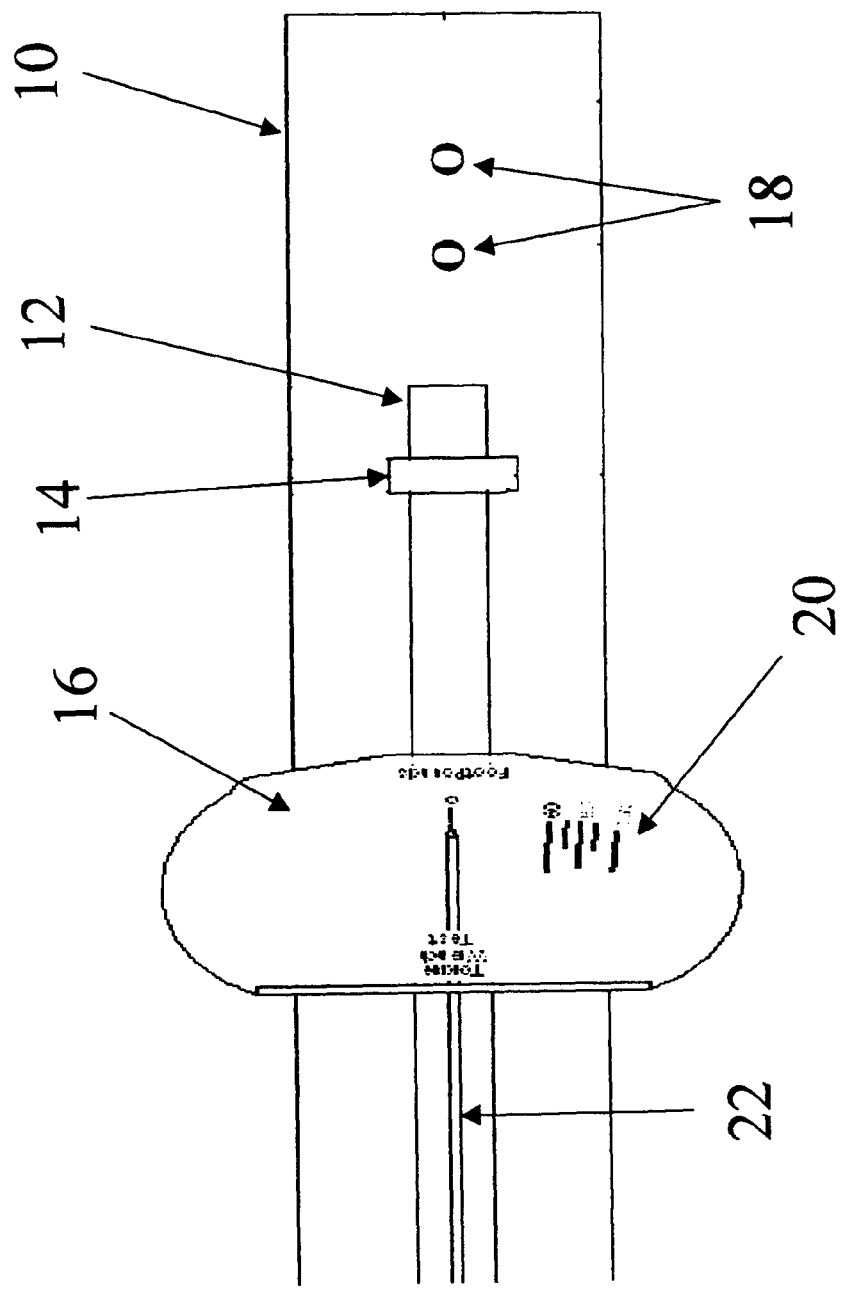
FIG. 1(B) shows a top view of the scale side of one embodiment of the device of the present invention.

FIG. 1(B) shows one embodiment of the scale end of the device of the present invention. The base unit (10) supports the torque wrench of known calibration which comprises the lever arm (12), the pointer arm (22), the scale (16) the mounting holes (18) and the mounting ring (14) which secures the lever arm (12) of the torque wrench of known calibration.

In the context of the present invention, a scale need not be a fixed scale such is illustrated in FIG. 1(b). In fact, the present invention is not limited to any particular type of scale. For example, the scale of the present invention (whether on a torque wrench to be tested or a torque wrench of known calibration) may comprises a dial, a digital readout, a "click-type" scale like those found on "click-type" torque wrenches, etc.

Figure 1C:
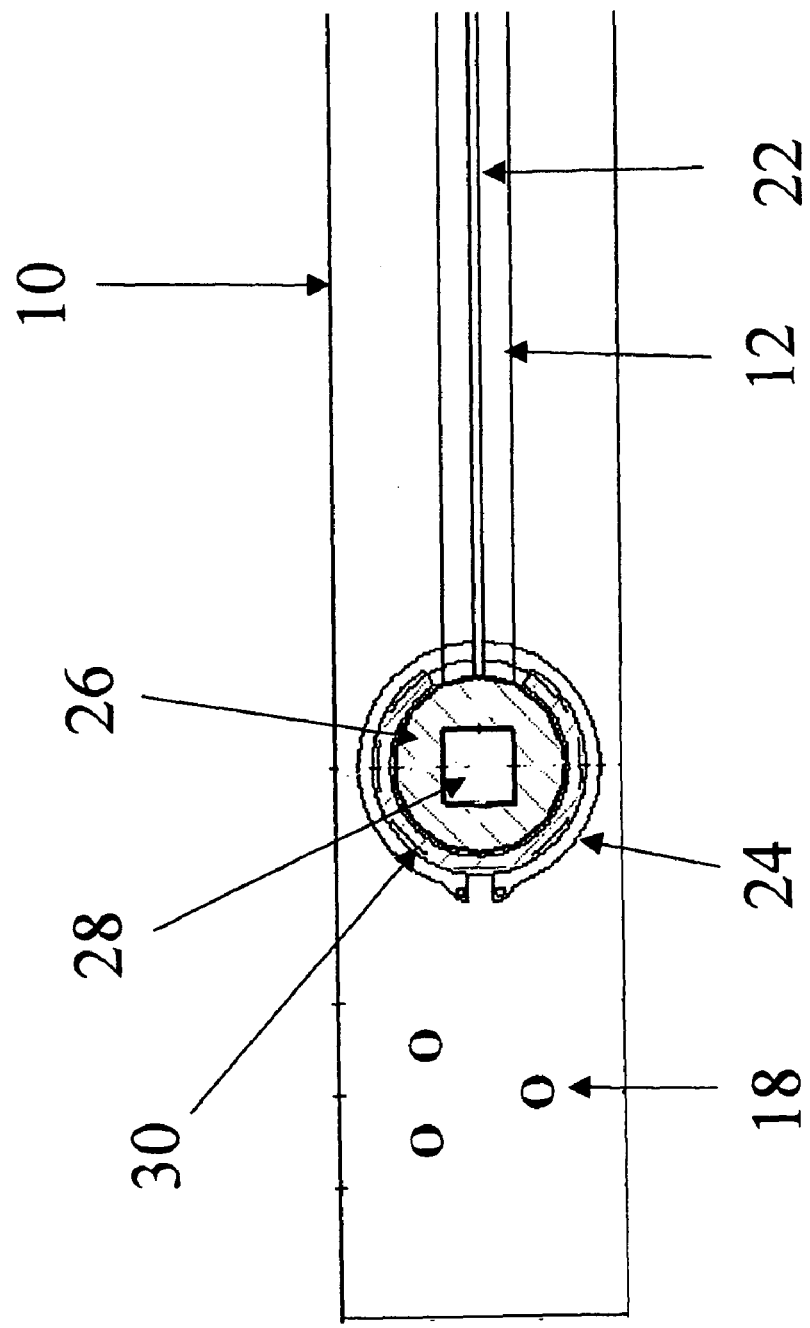
FIG. 1(C) shows a top view of the head side of one embodiment device of the present invention.

FIG. 1(C) shows one embodiment of the head end of the device of the present invention. The base unit (10) supports the torque wrench of known calibration which comprises the lever are (12), the pointer arm (22), the mounting holes (18), the mounting cylinder (30), the retaining ring (24), the torque wrench head (26) and the female socket hole (28).

Figure 2:
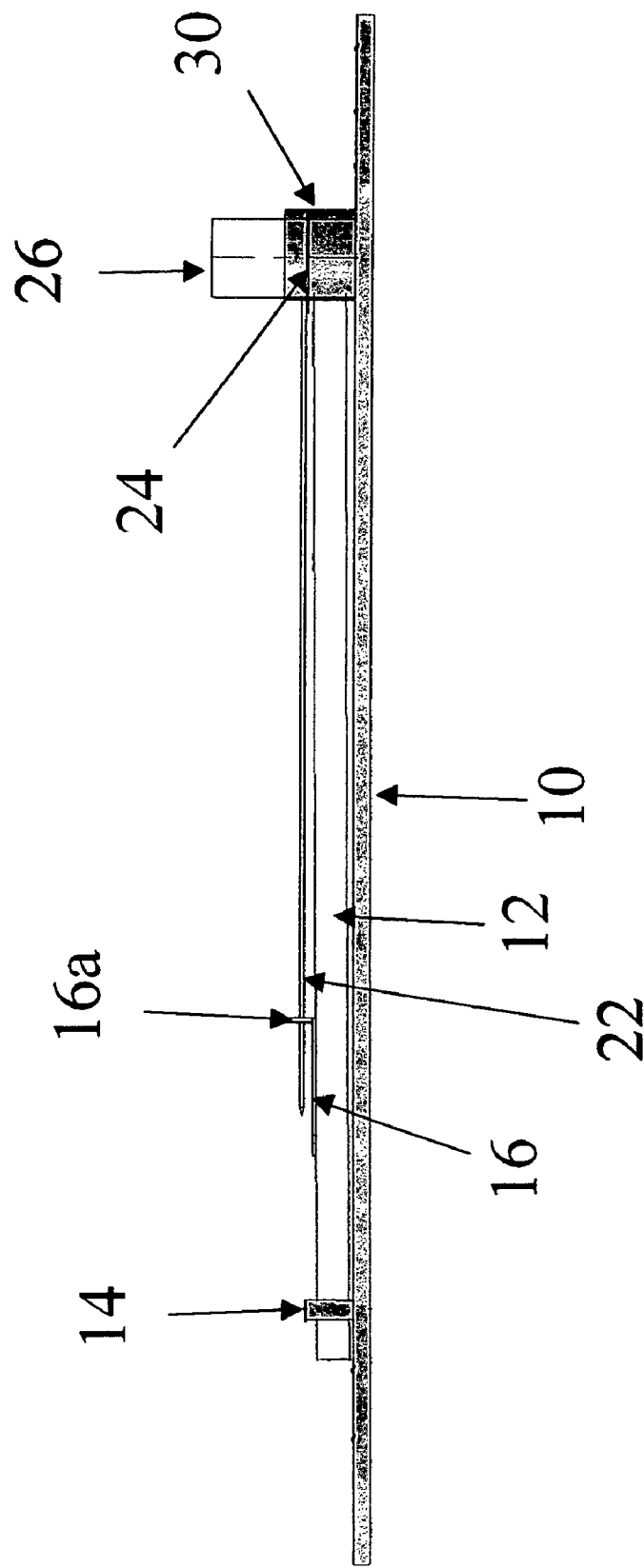
FIG. 2 shows a side view of one embodiment of the device of the present invention.

FIG. 2 shows one embodiment of a side view of the device of the present invention. The base unit (10) supports the torque wrench of known calibration which comprises the lever are (12), the pointer arm (22), the scale (16), the scale back (16a), the mounting cylinder (30), the retaining ring (24), the torque wrench head (26) and the mounting ring (14).

Figure 3:
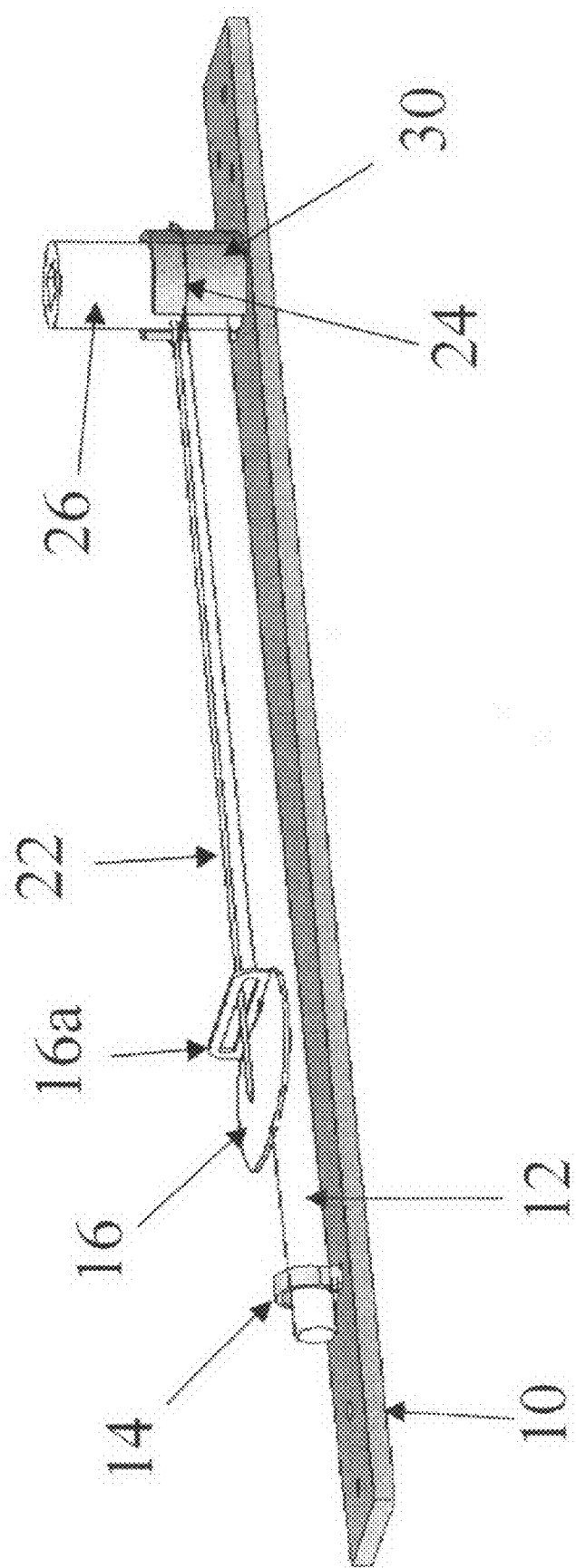
FIG. 3 shows a ¾ side view of one embodiment of the device of the present invention.

FIG. 3 shows one embodiment of a ¾ side view of the device of the present invention. The base unit (10) supports the torque wrench of known calibration which comprises the lever are (12), the pointer arm (22), the scale (16), the scale back (16a), the mounting cylinder (30), the retaining ring (24), the torque wrench head (26) and the mounting ring (14).

Figure 4:
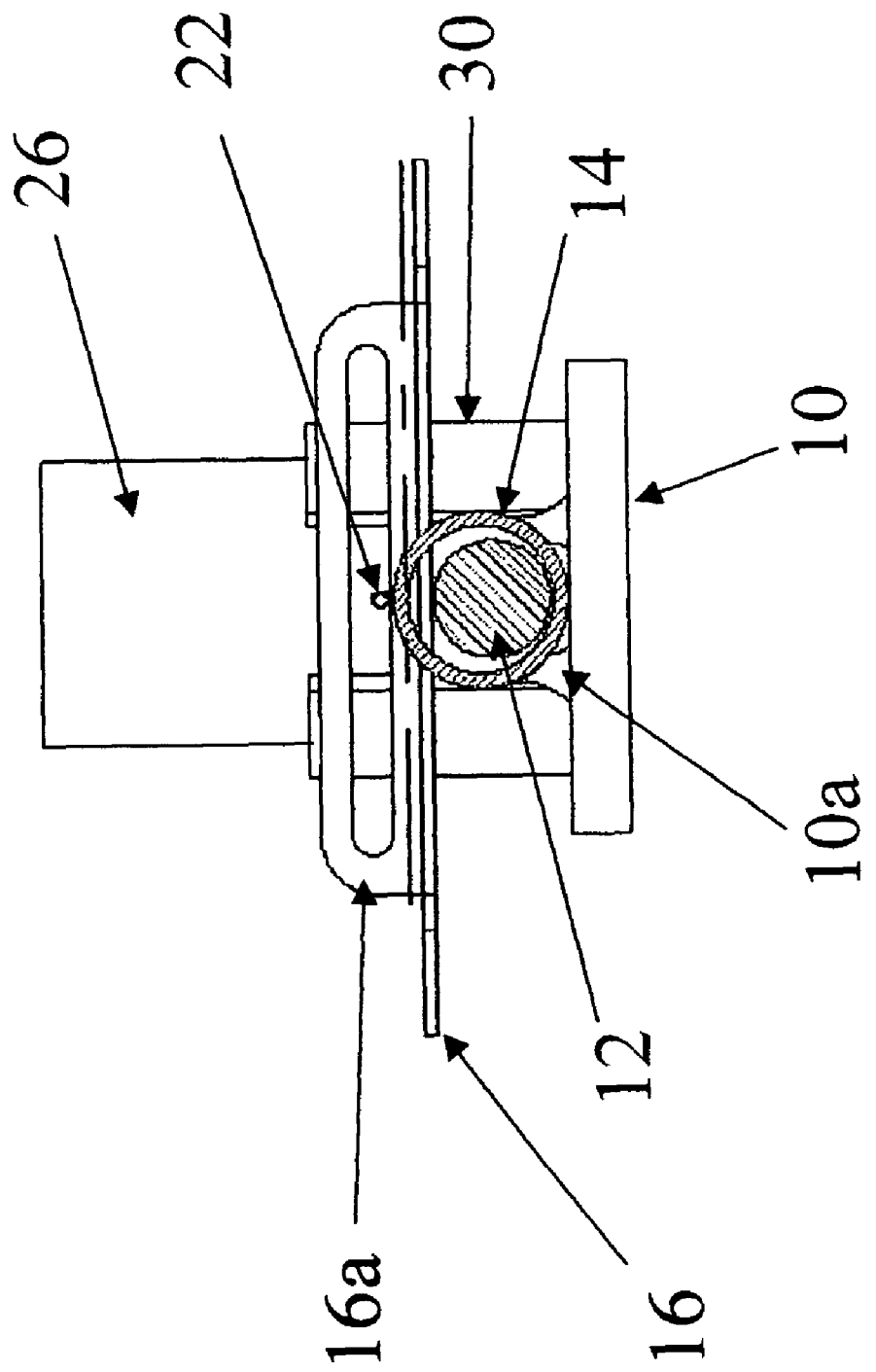
FIG. 4 shows an end view of one embodiment of the device of the present invention.

FIG. 4 shows one embodiment of an end view of the device of the present invention. The base unit (10) supports the torque wrench of known calibration which comprises the lever are (12), the pointer arm (22), the scale (16), the scale back (16a), the mounting cylinder (30), the torque wrench head (26) and the mounting ring (14). The mounting ring (14) is mounted to supports (10a) to the base unit (10).

What is claimed is:

1. A device for testing the accuracy of torque wrenches, said device comprising:
    a. a base unit comprising a first mounting means and a second mounting means, said first and second mounting means suitable for mounting a torque wrench of known calibration, said torque wrench of known calibration comprising a scale and a head, said head modified to receive the male socket of a torque wrench to be tested;
    b. said base unit having a means for mounting said base unit to a suitable surface;
    c. said first mounting means comprising a ring mounted substantially perpendicularly to said base unit, said ring positioned and sized to receive the lever arm of said torque wrench of known calibration and said second mounting means comprising a hollow cylinder for receiving the head of the torque wrench of known calibration comprising a center area and a wall, said cylinder mounted to said base unit such that the axis of said cylinder is substantially perpendicular to said base unit and said cylinder has a portion of the wall of said cylinder removed thereby creating a recess in the wall of said cylinder for positioning the lever arm of the torque wrench of known calibration and a groove in the outer wall of said cylinder, said groove being substantially parallel to said base unit, said groove being capable of receiving a ring, said groove positioned such that when said ring is placed in said groove, said ring prevents said torque wrench of known calibration from being removed from said cylinder.

2. The device of claim 1, wherein said means for mounting said base unit is selected from a group consisting of bolts, nuts, welding, screws, nails and adhesives.

3. The device of claim 1, wherein said scale is in foot pounds and reads from about 50 to 100 foot pounds in 10-pound increments.

4. The device of claim 1, wherein said scale is in foot pounds and reads from about 50 to 100 foot pounds in 5-pound increments.

5. The device of claim 1, wherein said torque wrench of known calibration is a beam-type torque wrench.

6. The device of claim 1, wherein said torque wrench of known calibration is calibrated prior to incorporation into the device of claim 1 with a stress tester.

7. The device of claim 1, wherein said base unit is comprised of metal or metal alloys.

8. A method of testing the calibration of torque wrenches, said method comprising:
    a. placing the male socket of a torque wrench to be tested into the female socket of the torque wrench of known calibration of the device of claim 1;
    b. applying pressure to the torque wrench to be tested;
    c. reading the scales of the torque wrench to be test and the torque wrench of known calibration; and,
    d. comparing the readings wherein a difference of greater than 5% between the reading on the torque wrench of known calibration and the torque wrench to be tested indicates that the torque wrench to be tested is out of calibration.

9. The method of claim 8, wherein a difference of greater than 2% between the reading on the torque wrench of known calibration and the torque wrench to be tested indicates that the torque wrench to be tested is out of calibration.

10. The method of claim 8, wherein a difference of greater than 1% between the reading on the torque wrench of known calibration and the torque wrench to be tested indicates that the torque wrench to be tested is out of calibration.

11. A method of testing the calibration of torque wrenches, said method comprising:
    a. providing: a device for testing the accuracy of torque wrenches, said device consisting essentially of a base unit comprising a first mounting means and a second mounting means, said first and second mounting means suitable for mounting a torque wrench of known calibration, said torque wrench comprising a scale and a head modified to receive the male socket of a torque wrench to be tested said base unit, said base unit secured to a surface suitable for holding the device without moving when torque is applied to said torque wrench to be tested;
    b. placing the male socket of a torque wrench to be tested, said torque wrench to be tested comprising a scale, into the female socket of a torque wrench of known calibration of the device of step a;
    c. applying pressure to the torque wrench to be tested;
    d. reading the scales of the torque wrench to be test and the torque wrench of known calibration; and,
    e. comparing the readings wherein a difference of greater than 5% between the reading on the torque wrench of known calibration and the torque wrench to be tested indicates that the torque wrench to be tested is out of calibration.

12. The method of claim 11, wherein a difference of greater than 2% between the reading on the torque wrench of known calibration and the torque wrench to be tested indicates that the torque wrench to be tested is out of calibration.

13. The method of claim 11, wherein a difference of greater than 1% between the reading on the torque wrench of known calibration and the torque wrench to be tested indicates that the torque wrench to be tested is out of calibration.

* * * * *